(12) United States Patent
Delfino

(10) Patent No.: US 9,105,893 B2
(45) Date of Patent: Aug. 11, 2015

(54) ELECTRICALLY POWERED VEHICLE HAVING A FUEL CELL COMPRISING A SODIUM CHLORATE DECOMPOSITION REACTOR FOR SUPPLYING THE CELL WITH OXYGEN

(75) Inventor: Antonio Delfino, Clermont-Ferrand Cedex (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 0 days.

(21) Appl. No.: 13/806,258

(22) PCT Filed: Jun. 7, 2011

(86) PCT No.: PCT/EP2011/059377
§ 371 (c)(1),
(2), (4) Date: Jan. 16, 2013

(87) PCT Pub. No.: WO2012/000743
PCT Pub. Date: Jan. 5, 2012

(65) Prior Publication Data
US 2013/0164642 A1 Jun. 27, 2013

(30) Foreign Application Priority Data
Jun. 29, 2010 (FR) .................... 10 55212

(51) Int. Cl.
*H01M 8/06* (2006.01)
*H01M 8/04* (2006.01)
*B60L 11/18* (2006.01)

(52) U.S. Cl.
CPC ......... *H01M 8/0606* (2013.01); *B60L 11/1805* (2013.01); *B60L 11/1883* (2013.01);
(Continued)

(58) Field of Classification Search
USPC .................................................. 429/416, 502
See application file for complete search history.

(56) References Cited

U.S. PATENT DOCUMENTS

| | | | |
|---|---|---|---|
| 3,608,660 A | 9/1971 | Smith et al. | 180/54 B |
| 4,628,010 A | 12/1986 | Iwanciow | 429/19 |

(Continued)

FOREIGN PATENT DOCUMENTS

| | | | |
|---|---|---|---|
| EP | 1 460 704 A1 | 9/2004 | |
| JP | 2002308445 A | * 10/2002 | |

(Continued)

OTHER PUBLICATIONS

IPDL Machine Translation of the Detailed Description JP 2006096580A (Apr. 2006).*

(Continued)

*Primary Examiner* — Gregg Cantelmo
(74) *Attorney, Agent, or Firm* — Fitzpatrick, Cella, Harper & Scinto

(57) ABSTRACT

An electrically powered vehicle includes a fuel cell with a decomposition reactor for decomposing sodium chlorate ($NaClO_3$). Reaction products produced by the decomposition reactor include oxygen and sodium chloride (NaCl). Gaseous hydrogen is stored onboard the vehicle, such as in a hydrogen tank at a low pressure, using metal hydrides. The hydrogen from the hydrogen tank and the oxygen produced by the decomposition reactor are consumed by the fuel cell in order to produce electricity. The vehicle further includes a storage tank for storing the NaCl produced by decomposition of the $NaClO_3$.

10 Claims, 4 Drawing Sheets

(52) U.S. Cl.
CPC ......... *B60L11/1892* (2013.01); *B60L 11/1896* (2013.01); *H01M 8/04097* (2013.01); *H01M 8/04216* (2013.01); *H01M 8/065* (2013.01); *B60L 2200/10* (2013.01); *B60L 2200/12* (2013.01); *B60L 2200/32* (2013.01); *B60L 2210/14* (2013.01); *Y02E 60/50* (2013.01); *Y02T 10/7225* (2013.01); *Y02T 90/34* (2013.01)

(56) References Cited

U.S. PATENT DOCUMENTS

| | | | |
|---|---|---|---|
| 4,797,186 | A | 1/1989 | Levy et al. .................... 204/129 |
| 5,372,617 | A | 12/1994 | Kerrebrock et al. ............. 48/61 |
| 5,419,818 | A | 5/1995 | Wanngard ....................... 204/95 |
| 5,655,692 | A * | 8/1997 | Navin et al. ................... 222/413 |
| 7,337,799 | B2 | 3/2008 | Delfino et al. ................. 137/79 |
| 2004/0155149 | A1* | 8/2004 | Dossas et al. ................. 244/128 |
| 2004/0185328 | A1* | 9/2004 | Lin et al. ......................... 429/50 |
| 2005/0142403 | A1* | 6/2005 | Ulmer et al. .................... 429/19 |
| 2007/0051241 | A1* | 3/2007 | Boyd et al. ...................... 96/108 |
| 2007/0128485 | A1* | 6/2007 | Zhao et al. ..................... 429/26 |
| 2007/0196702 | A1* | 8/2007 | Sridhar et al. .................. 429/17 |
| 2008/0160387 | A1 | 7/2008 | Delfino ............................ 429/34 |

FOREIGN PATENT DOCUMENTS

| | | |
|---|---|---|
| JP | 2002-363779 A | 12/2002 |
| JP | 2006096580 A * | 4/2006 |

OTHER PUBLICATIONS

Honda: "FCX Clarity," presented at FCV Copenhagen Parade, Nov. 30, 2009, retrievable from the Internet at: http://bridge2h.com/wp-content/uploads/2009/11/FCH-Meeting-30nov-program-invitation-final.pdf.

* cited by examiner

ELECTRICALLY POWERED VEHICLE HAVING A FUEL CELL COMPRISING A SODIUM CHLORATE DECOMPOSITION REACTOR FOR SUPPLYING THE CELL WITH OXYGEN

TECHNICAL FIELD OF THE INVENTION

The present invention relates to an electrically powered vehicle comprising at least one motor capable of acting on at least one device for the forward progression of the vehicle (wheel, helix, turbine, blade, track chain), a fuel cell and a supply for the fuel cell based on hydrogen and on oxygen which are provided by an onboard system for supplying hydrogen and an onboard system for supplying pure oxygen.

STATE OF THE PRIOR ART

Vehicles using a fuel cell operating with pure oxygen and hydrogen exhibit several advantages with respect to the fuel cell operating with atmospheric oxygen. These advantages include in particular the following distinctive features: the power density is higher (compactness), the system for controlling the gases from the fuel cell is greatly simplified, it is not necessary to moisten the gases entering the fuel cell, the cost is lower for a given power, the output of the system is higher, the air compressor is dispensed with and no polluting gas is introduced into the fuel cell by the air.

All the same, some major disadvantages remain. First, the on-board weight of the pure high-pressure oxygen tank is relatively high and, secondly, the use of pressurized gas presents certain risks. The pressure has to be limited as the gas becomes extremely dangerous when the pressure exceeds 200 bar. During an adiabatic reduction in pressure, many materials ignite spontaneously on contact with the oxygen.

The invention provides various technical means for overcoming these various disadvantages.

ACCOUNT OF THE INVENTION

First of all, a first aim of the invention consists in providing an ecological and economical vehicle.

Another aim of the invention consists in providing a vehicle giving a high level of safety.

In order to do this, the invention first of all provides an electrically powered vehicle comprising:
at least one electric motor capable of acting on at least one device for the forward progression of the vehicle;
a fuel cell;
a supply for the fuel cell based on hydrogen provided by a hydrogen supply system;
characterized in that it comprises an onboard pure oxygen supply system in the vehicle, the said pure oxygen supply system comprising a sodium chlorate tank, a reactor for the decomposition of the sodium chlorate in contact in fluid fashion with the sodium chlorate tank and connected to the fuel cell in order to supply the latter with pure oxygen after decomposition of the sodium chlorate, and a storage tank for the sodium chloride produced by the decomposition of the sodium chlorate.

The use of a reactor for the decomposition of sodium chlorate ($NaClO_3$) makes it possible to load sodium chlorate into a vehicle (submarine, aircraft, car, motorcycle, and the like) in order to produce, in situ, oxygen for use in an electricity-producing fuel cell and thus to avoid the disadvantages related to its high-pressure storage, which requires numerous precautions in order to be able to be done under optimum safety conditions.

The hydrogen can be stored in gaseous form at high pressure, as well known in the state of the art. This method of storage is well controlled and does not present any particular difficulty. However, in a preferred embodiment of a vehicle according to the invention, in order to avoid the storage of high pressure hydrogen, the hydrogen supply system comprises a tank at substantially low pressure for the storage of the gas using metal hydrides, the said tank being in contact in fluid fashion with the fuel cell in order to supply the latter with hydrogen.

Consequently, in order to benefit fully from the invention, the manufacture of oxygen other than by electrolysis of water should preferably be reconsidered.

It is observed that the decomposition products of sodium chlorate ($NaClO_3$) are sodium chloride or salt ($NaCl$) and oxygen. The salt can optionally be used again to recreate the sodium chlorate. The oxygen is used to supply the fuel cell. This is a clean fuel, providing a high output, contributing, first, to generating a large amount of energy and, secondly, to being friendly to the environment in which the vehicle is moving.

According to an advantageous embodiment, the reactor for decomposition of the $NaClO_3$ is connected to a source of heat (for generating the decomposition reaction).

Advantageously, the $NaClO_3$ tank and the hydrogen tank each comprise filling pipes which can be connected to an external source for filling the tanks.

The system for supplying with pure oxygen is advantageously designed so as to be able to provide the $NaClO_3$ in substantially solid form to the decomposition reactor.

According to an advantageous alternative form, the $NaClO_3$ is provided to the reactor by a mechanical supply system, such as, for example, by an endless screw, or by gravity.

DESCRIPTION OF THE FIGURES

All the implementational details are given in the description which follows, supplemented by FIGS. 1 to 4, which are presented solely for the purposes of non-limiting examples and in which.

DETAILED DESCRIPTION OF THE INVENTION

Figure 1:
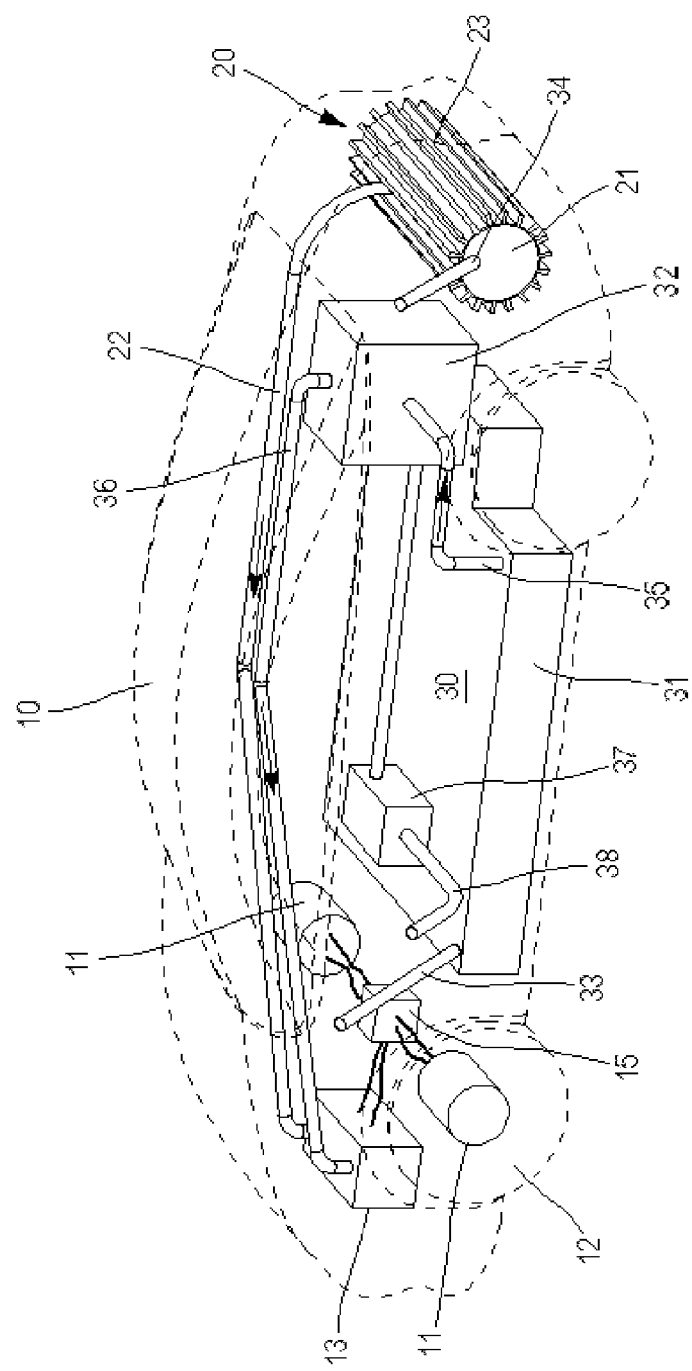
FIG. 1 diagrammatically represents a vehicle of electrical engine type with a low-pressure hydrogen tank according to the invention.

FIG. 1 shows an example of a vehicle 10, the propulsion means of which, in this example electric motors 11 incorporated in the wheels 12, are supplied by means of a fuel cell 13. The fuel cell operates conventionally, based on hydrogen and oxygen. The cell thus makes it possible to generate continuous current, sent via a DC/DC converter 15 to the two motors, provided in the front wheels of the vehicle illustrated. The DC/DC converter makes it possible to adjust the voltage provided by the cell to that required by the motors. For example, for a cell providing a voltage of 90 to 150 volts, the converter increases the voltage, for example to values which can lie between 250 and 300 volts. According to other implementational examples, motors are provided which are incorporated in the rear wheels of the vehicle or also a single motor is provided, coupled to transmission means of known type.

The hydrogen provided to the cell 13 advantageously originates from a hydrogen supply system 20 comprising a hydrogen tank 21 at substantially low pressure which makes possible storage of metal hydrides. This advantageous storage means makes it possible to optimize the amount of gas, making it possible, for example, to be able to store a large amount of hydrogen at a relatively low pressure lying between 3 and 15 bar. The storage system comprising metal hydrides is described in more detail a little later in the description.

A hydrogen pipe 22 makes it possible to connect the hydrogen tank 21 to the fuel cell 13.

Figure 3:
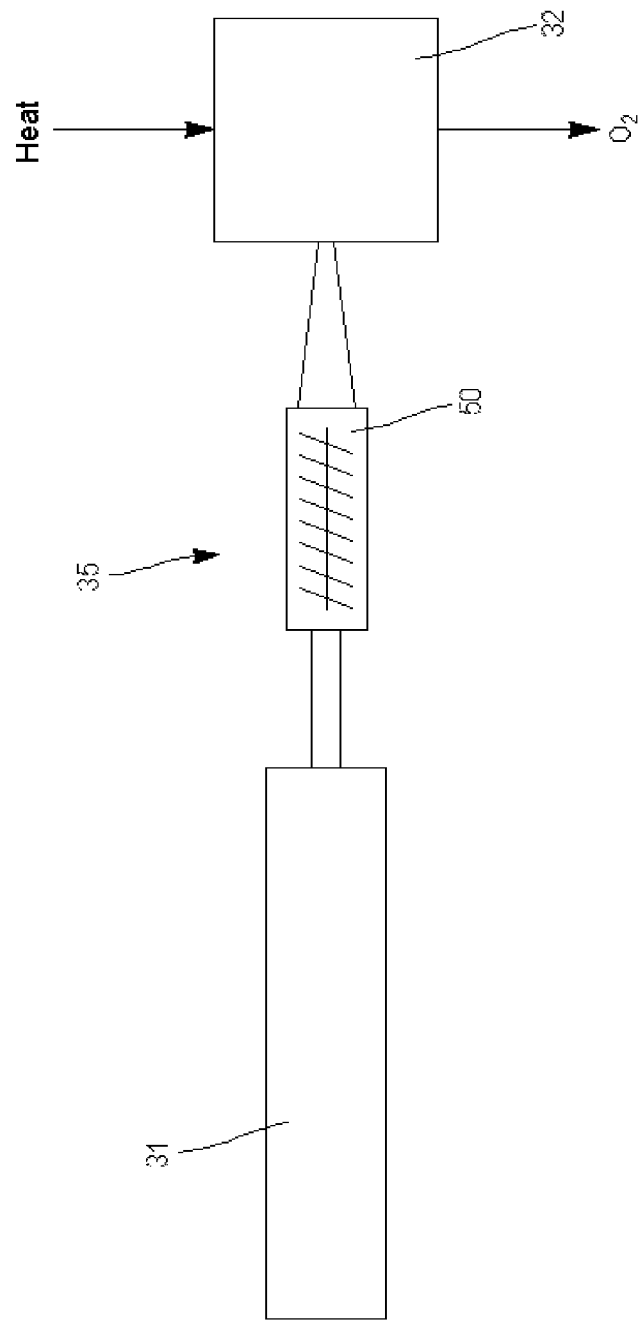
FIG. 3 shows an example of a means used to allow the $NaClO_3$ to be transported, in this example an endless screw.
Figure 4:
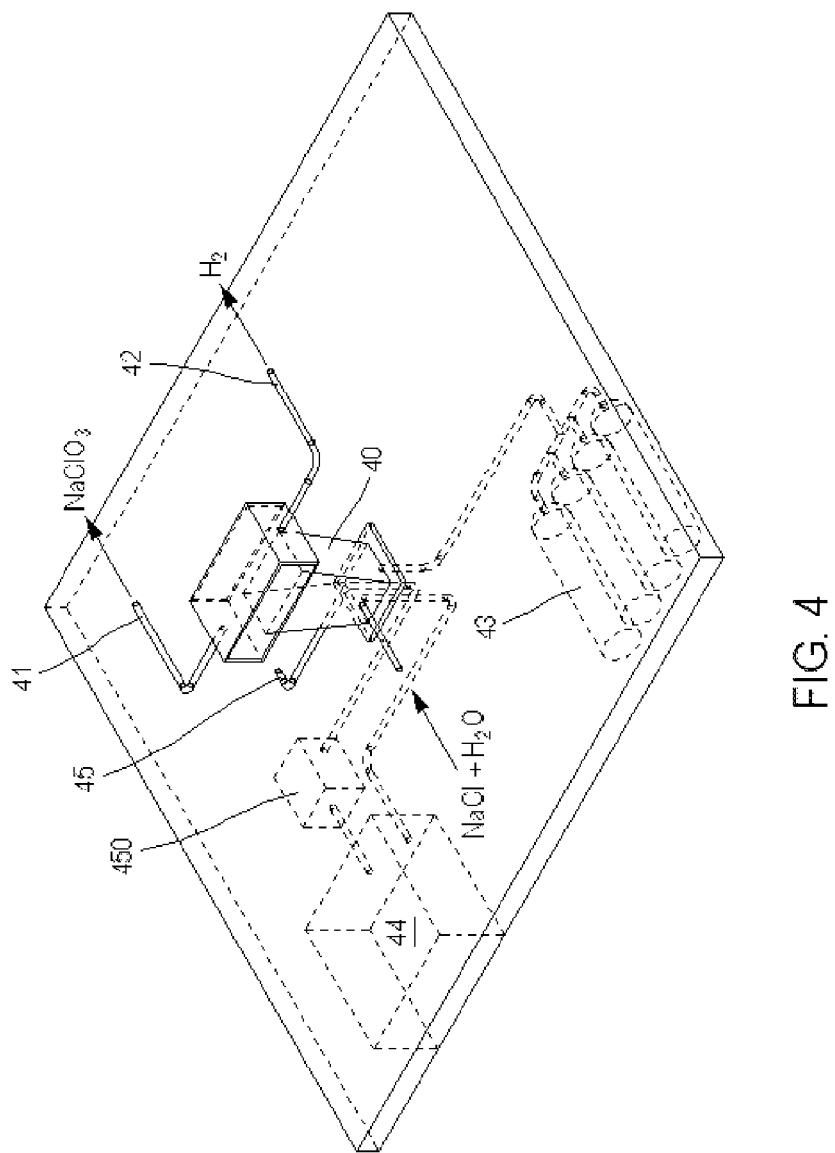
FIG. 4 presents an example of a service station provided with intermediate storage tanks.

The pure oxygen provided to the cell advantageously originates from a reactor 32 for the decomposition of $NaClO_3$ placed, by means of a transfer line 35, in contact in fluid fashion with a sodium chlorate tank 31. FIG. 3 shows an example of a means which makes it possible to supply sodium chlorate from the sodium chlorate tank 31 to the reactor 32. In this example, an endless screw 50, positioned between the two components, is used to withdraw the chlorate, in the powder form, from the sodium chlorate tank 31 and to transport it to the reactor 32. In an alternative embodiment (not illustrated), the sodium chlorate is transported to the reactor 32, positioned substantially under the sodium chlorate tank 31, by gravity.

The onboard sodium chlorate is decomposed by the reactor installed in the vehicle in proportion to the demand for oxygen coming from the fuel cell. The decomposition of the sodium chlorate is governed by the following reaction:

$NaClO_3 + \text{"Heat"} \rightarrow NaCl + 3O_2$; as this reaction is endothermic, it consumes energy on board the vehicle; the necessary energy is withdrawn from the electrical energy produced by the fuel cell; however, the output of this reaction is very high and the overall energy balance on board the vehicle remains very advantageous, the share of energy withdrawn from the fuel cell in order to thus supply it with oxygen remaining modest.

The oxygen resulting from the reaction of the reactor 32 is transported to the fuel cell 13 via an oxygen pipe 36. Rather than disperse the sodium chloride (NaCl) as it is produced, according to the invention, it is stored on board the vehicle, in a sodium chloride storage tank 37, in order to be able to discharge it, via a discharge pipe 38, at a collection point and to recycle this product in any appropriate manner. To this end, a recycling line 39 connects the reactor 32 to the sodium chloride storage tank 37; in order to ensure the transfer of sodium chloride, it is for example possible to use an endless screw system (not represented in the drawings).

Figure 2:
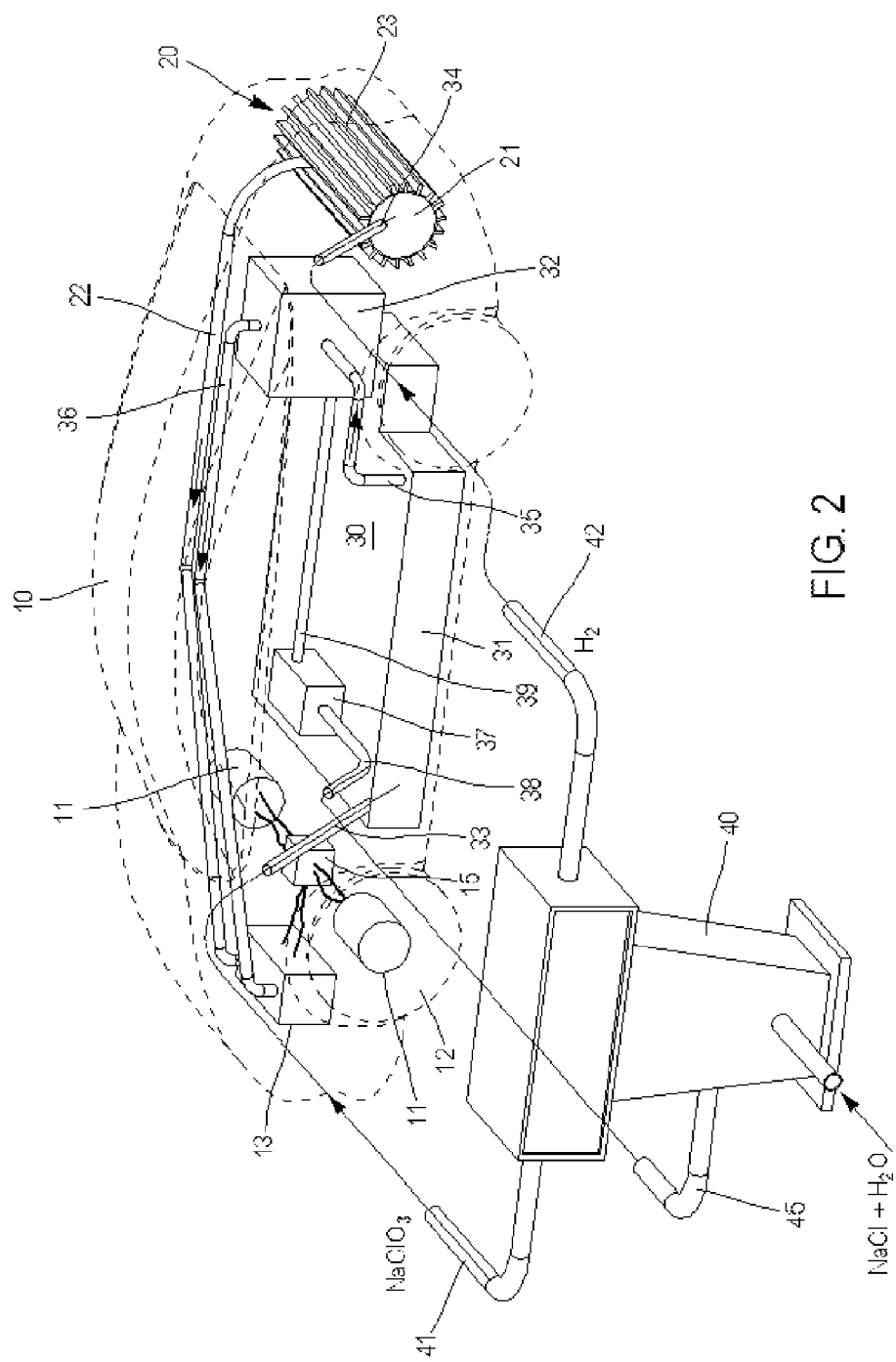
FIG. 2 shows the same vehicle in connection with a service station.

The sodium chlorate tank 31 and the hydrogen tank 21 are supplied with sodium chlorate, on the one hand, and with hydrogen, on the other hand, when the vehicle 10 is connected to a service station 40, as presented in FIG. 2. The service station 40 is equipped with two sites 41 and 42 for connecting to the filling pipes 33 and 34 of the vehicle. The service station 40 is also equipped with a connection 45 for connecting to the discharge pipe 38 of the vehicle.

The service station 40 is designed to produce sodium chlorate and hydrogen using at least one NaCl electrolyser. The service station must furthermore be supplied with water, salt and energy in order to make possible the electrolysis reaction. Thus, at a service station, the salt (NaCl) mixed with water ($H_2O$) is electrolysed so as to produce sodium chlorate ($NaClO_3$) and hydrogen ($H_2$). The following chemical reaction illustrates it.

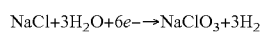

$NaCl + 3H_2O + 6e^- \rightarrow NaClO_3 + 3H_2$

It is observed that this reaction produces gaseous hydrogen and solid sodium chlorate which includes three oxygen atoms. The sodium chlorate can thus be easily stored without having recourse to a pressurized tank with all the constraints related to this. Furthermore, sodium chlorate is not dangerous. Consequently, it can be easily transportable in a vehicle without danger. Intermediate storage tanks for the hydrogen (hydrogen holding tank 43) and/or for the $NaClO_3$ (storage vessel 44) are advantageously provided in the service station. The service station also comprises a second storage vessel 450 for the sodium chloride originating from the vehicles via the connection 45, everything with the technical means appropriate for providing for the transfer of the said sodium chloride (endless screw or other suitable means). These holding tanks and storage vessel make it possible to produce the hydrogen and the sodium chlorate with complete freedom and with more flexibility, without real-time supplying constraint. For the service station, the storage constraints for the hydrogen are not as severe as on a vehicle. Thus, the hydrogen holding tank of the service station can be either a pressurized tank or alternatively a tank with hydrides, similar to that of a vehicle, but preferably with a volume corresponding to the recharging of several vehicles. Transportation means of known type, such as, for example, pipes provided with endless screws, make it possible to transfer the $NaClO_3$ from the holding tank to the vehicle to be supplied.

It should also be emphasized that, since, according to the scheme provided by the invention, each vehicle produces sodium chloride (NaCl) and since each service station consumes sodium chloride, preferably, each service station has available an item of equipment (not represented in the drawings) for collecting the sodium chloride stored on board the vehicle, in order to recycle it in the service station for the production of the sodium chlorate ($NaClO_3$).

In order to store the hydrogen in an optimal fashion, tanks comprising metal hydrides are advantageously provided on board the vehicles. With such tanks, the metal compound acts as a hydrogen sponge. There exist several metals and metal alloys which have the property of absorbing hydrogen in their crystal lattice. During the filling of a tank, the molecular hydrogen $H_2$ diffusing in the metal is stored in the atomic form H. The molecular bond is weakened and a release of heat ensues (exothermic reaction). It is therefore advantageous to provide a cooling means which makes it possible to cool the tank during the filling. In the example of FIG. 1, the hydrogen tank 21 is provided with fins 23 which make possible sufficient cooling if the charging time is not too short. For more efficient cooling, a liquid-based cooling system can be provided.

Conversely, in order to empty the tank, an energy supply is required in order to recreate the molecular bond when the atomic hydrogen leaves the hydride. In order to be able to be carried out, the endothermic reaction requires drawing energy from the surroundings, so that the tank cools. Advantageously, a supply of energy makes it possible to optimize the expulsion of the hydrogen. The cooling water of the fuel cell, once charged with heat energy, can make it possible to provide a portion or all of the energy required.

The most well known metal hydrides are: $FeTiH_{1.7}$, $LaNi_5H_6$, $MgH_2$ and $Mg_2NiH_2$.

The weight of hydrogen stored in the tank per unit of volume is undoubtedly one of the greatest advantages of such a tank configuration with metal hydrides. The weight by volume of hydrogen stored lies within 60 g/l and 130 g/l. By way of comparison, the hydrogen compressed at 350 bar in a tank made of composite (for example made of resin carbon fibres) has a density of 25 g/l. For liquid hydrogen, 71 g/l are obtained. This amounts to saying that the technology of metal hydrides makes it possible to store a great deal of hydrogen in a small volume.

The invention claimed is:

1. An electrically powered automobile, comprising:
    at least one electric motor structured to act on at least one device for causing forward progression of the automobile;
    a fuel cell;
    a hydrogen supply system for supplying hydrogen to the fuel cell;
    a hydrogen filling conduit for transferring hydrogen received from an external fueling system to the hydrogen supply system;
    a pure oxygen supply system onboard the automobile, the pure oxygen supply system including a sodium chlorate ($NaClO_3$) tank;
    a $NaClO_3$ filling conduit for transferring $NaClO_3$ received from the external fueling system to the $NaClO_3$ tank;
    a decomposition reactor for decomposing $NaClO_3$, the decomposition reactor being in contact in fluid fashion with the sodium chlorate tank and being connected to the fuel cell in order to supply the fuel cell with pure oxygen produced by decomposition of the $NaClO_3$;
    a storage tank for storing sodium chloride produced by the decomposition of the $NaClO_3$; and
    a discharge conduit for transferring sodium chloride from the storage tank to the external fueling system.

2. The electrically powered automobile according to claim 1, wherein the hydrogen supply system includes a hydrogen tank at substantially a low pressure, for storage of hydrogen using metal hydrides, the hydrogen tank being in contact in fluid fashion with the fuel cell in order to supply the fuel cell with hydrogen.

3. The electrically powered automobile according to claim 1, wherein the decomposition reactor is connected to a source of heat.

4. The electrically powered automobile according to claim 1, wherein the pure oxygen supply system is structured to provide the $NaClO_3$ in substantially a solid form to the decomposition reactor.

5. The electrically powered automobile according to claim 4, wherein the $NaClO_3$ is provided to the decomposition reactor by a mechanical supply system.

6. The electrically powered automobile according to claim 5, wherein the $NaClO_3$ is provided to the decomposition reactor by an endless screw.

7. The electrically powered automobile according to claim 4, wherein the $NaClO_3$ is provided to the decomposition reactor by gravity.

8. The electrically powered automobile according to claim 1, wherein the hydrogen supply system stores hydrogen at a low pressure of between 3 bar and 15 bar.

9. The electrically powered automobile according to claim 1, wherein the hydrogen supply system includes metal hydride for hydrogen storage.

10. The electrically powered automobile according to claim 9, wherein the metal hydride stores hydrogen at a low pressure of between 3 bar and 15 bar.

* * * * *